US010606616B2

(12) United States Patent
Harding et al.

(10) Patent No.: US 10,606,616 B2
(45) Date of Patent: Mar. 31, 2020

(54) METHOD FOR CONTROL IN A PROCESS CONTROL SYSTEM IMPLEMENTED IN PART BY ONE OR MORE COMPUTER IMPLEMENTED RUN-TIME PROCESSES

(75) Inventors: Jeff Harding, Holly Springs, NC (US); Petter Dahlstedt, Surahammar (SE); Thomas Pauly, Vasteras (SE); Joakim Olsson, Vasteras (SE)

(73) Assignee: ABB Schweiz AG, Baden (CH)

(*) Notice: Subject to any disclaimer, the term of this patent is extended or adjusted under 35 U.S.C. 154(b) by 940 days.

(21) Appl. No.: 13/231,669

(22) Filed: Sep. 13, 2011

(65) Prior Publication Data

US 2012/0005270 A1 Jan. 5, 2012

Related U.S. Application Data

(63) Continuation of application No. PCT/EP2010/051767, filed on Feb. 12, 2010.
(Continued)

(51) Int. Cl.
*H04L 29/08* (2006.01)
*G05B 19/414* (2006.01)
(Continued)

(52) U.S. Cl.
CPC ......... *G06F 9/452* (2018.02); *G05B 19/4148* (2013.01); *G05B 23/0267* (2013.01); *H04L 67/125* (2013.01); *G05B 2219/31457* (2013.01)

(58) Field of Classification Search
CPC . H04L 67/125; H04L 67/025; H04L 12/2825; H04L 43/04; G06F 9/4445; G06F 3/0488; G06F 9/452; H04N 21/4316; H04N 21/42204; G05B 19/4148; G05B 23/0267; G05B 2219/31457
(Continued)

(56) References Cited

U.S. PATENT DOCUMENTS 5,734,380 A * 3/1998 Adams .................. G06F 3/0481
715/792
6,169,996 B1 1/2001 Tanabe
(Continued)

OTHER PUBLICATIONS

International Preliminary Report on Patentability; Application No. PCT/EP2010/051767; dated Mar. 14, 2011; 15 pages.
(Continued)

*Primary Examiner* — Gregory G Todd
(74) *Attorney, Agent, or Firm* — Whitmyer IP Group LLC

(57) ABSTRACT

A method for control in a process control system, where a graphical user interface of said process control system is arranged with graphic representations of one or more control objects for monitoring and/or control of a process or an equipment. The control system GUI is displayed by a control system client application on a computer or workstation. In addition, one or more applications for monitoring and/or controlling at least one said control object are run in a computing process environment separate from said process control system. No code components execute in the same processing space as that running the GUI for the process control system. Any flaw or error in the extended applications cannot affect the control system program controlling an industrial process in real-time. A control system and a computer program are also disclosed.

18 Claims, 6 Drawing Sheets

Related U.S. Application Data

(60) Provisional application No. 61/160,021, filed on Mar. 13, 2009.

(51) Int. Cl.
*G05B 23/02* (2006.01)
*G06F 9/451* (2018.01)

(58) Field of Classification Search
USPC .......................................................... 709/203
See application file for complete search history.

(56) References Cited

U.S. PATENT DOCUMENTS

| | | | |
|---|---|---|---|
| 7,844,442 B2 * | 11/2010 | Tzruya | 703/22 |
| 8,335,842 B2 * | 12/2012 | Raji et al. | 709/223 |
| 2005/0222698 A1 | 10/2005 | Eryurek et al. | |
| 2006/0230105 A1 * | 10/2006 | Shappir | H04L 67/08 709/203 |
| 2008/0052027 A1 * | 2/2008 | Witter et al. | 702/108 |
| 2008/0275853 A1 * | 11/2008 | Vail | H04L 67/125 |
| 2008/0275971 A1 | 11/2008 | Pretlove et al. | |
| 2008/0313545 A1 | 12/2008 | Patel et al. | |
| 2009/0254854 A1 * | 10/2009 | Adams | G06F 3/048 715/800 |

OTHER PUBLICATIONS

International Search Report and Written Opinion of the International Searching Authority; Application No. PCT/EP2010/051767; dated May 12, 2010; 15 pages.

\* cited by examiner

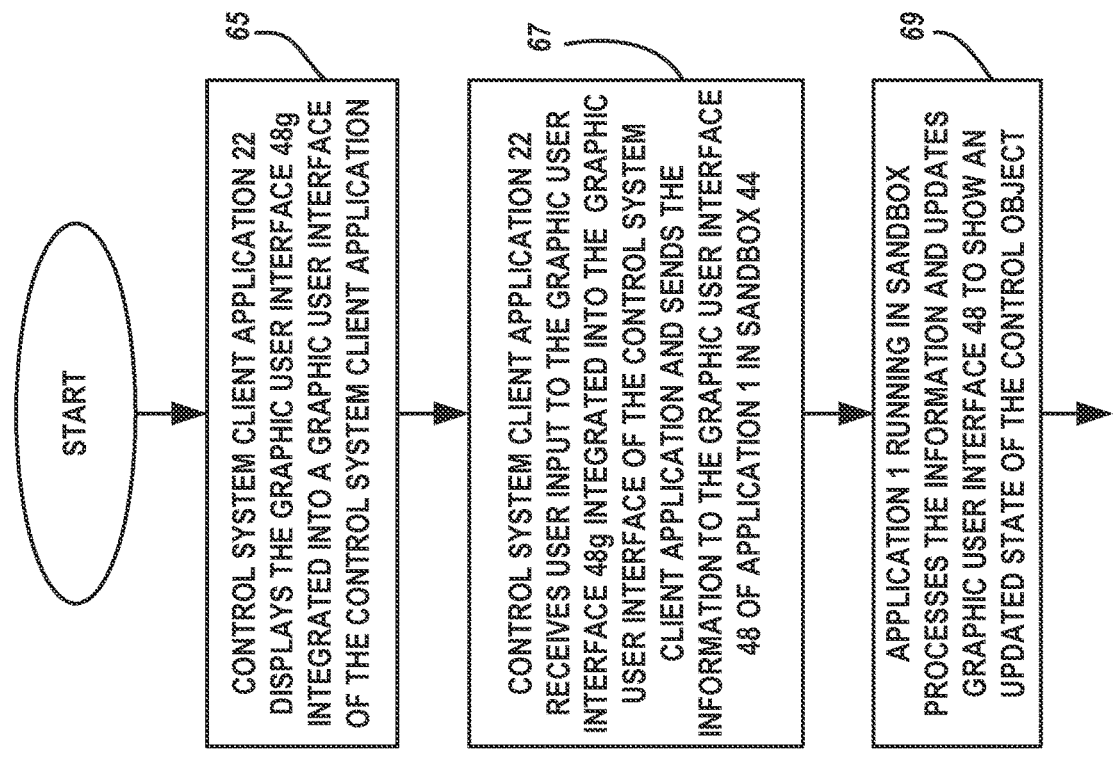
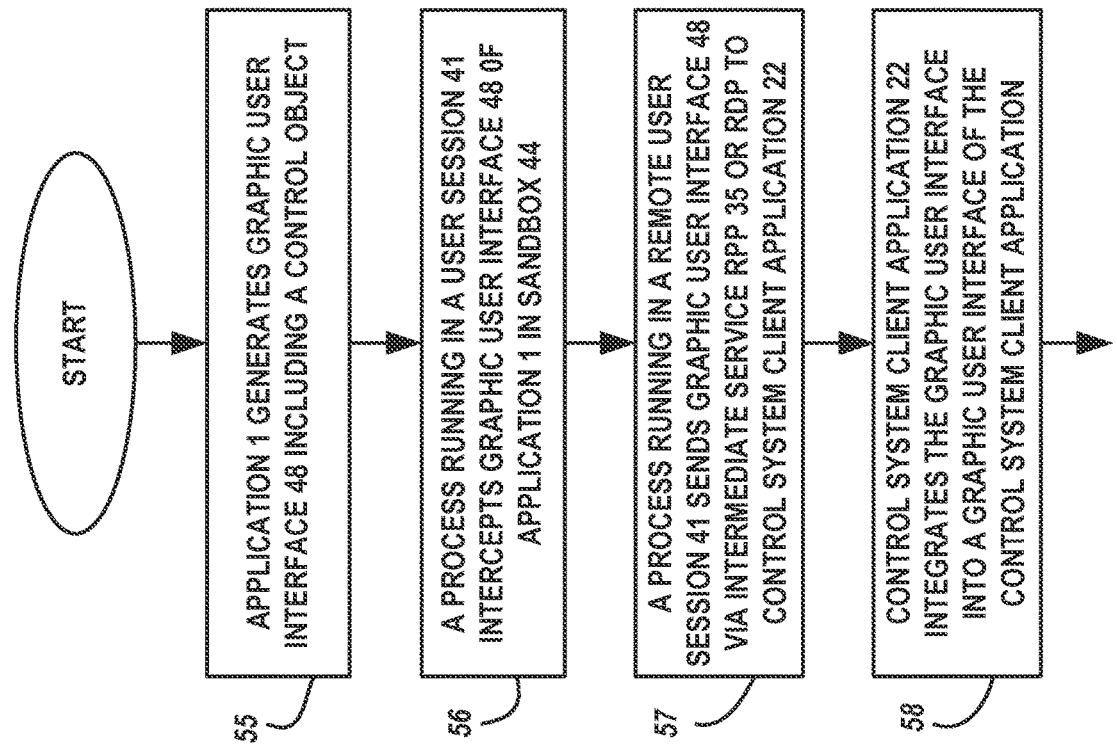
FIG. 5b
FIG. 5a

METHOD FOR CONTROL IN A PROCESS CONTROL SYSTEM IMPLEMENTED IN PART BY ONE OR MORE COMPUTER IMPLEMENTED RUN-TIME PROCESSES

CROSS-REFERENCE TO RELATED APPLICATIONS

The present application is a continuation of pending International patent application PCT/EP2010/051767 filed on Feb. 12, 2010 which claims the benefit under 35 U.S.C. § 119(e) of U.S. Provisional Patent Application Ser. No. 61/160,021, filed on Mar. 13, 2009. The content of all prior applications is incorporated herein by reference.

FIELD OF THE INVENTION

The present invention is concerned with an industrial control system graphic user interface. In particular it is concerned with a graphical user interface of a process control system used for monitoring and control purposes in an industrial installation.

BACKGROUND OF THE INVENTION

In computer based control systems for controlling manufacturing and process industries, such as chemical plants, oil refineries, pulp and paper mills, steel mills, etc., there is typically a need for integrating a wide range of different applications of different origin. In particular this integration includes integrating user interfaces, so that a user of the system experiences one single interface towards all functions of the system, even though different parts of this interface are provided by different computer-implemented applications. U.S. Pat. No. 6,169,996 disclosed a remote observation system for remote monitoring.

Traditional methods of providing this user interface integration include providing a software environment where user interface components from the different applications are plugged in to provide the integrated user interface. Examples of such technologies include ActiveX and Java Beans.

A conventional industrial control system typically includes one or more computer programs running in real time. Such programs control one or more processes in real time, which means that the control system must have an immediate or very short response time for at least some of the processes at all times. As control over many processes is normally critical from a safety standpoint it is important that the control systems are rigorously tested to eliminate any program execution problems or computer programming code problems that might cause delays or even failure of the control system.

A challenge with current approaches for user interface integration in a control system is that code components from the integrated applications execute in the same environment as components that are critical for the core functions of the control system, which is to control and supervise the industrial process. If any such integrated code component includes a flaw, it could potentially cause the entire user interface environment of the control system to crash or malfunction.

SUMMARY OF THE INVENTION

The aim of the present invention is to remedy one or more of the above mentioned problems. This and other aims are obtained by a method for control carried out in a process control system wherein a graphical user interface of said process control system comprises graphic representations of one or more control objects for monitoring and controlling a process or an equipment, wherein the graphical user interface is displayed by a client application of said process control system running in a first computer processing environment on a computer or workstation.

In a first aspect of the invention a method is disclosed for control in a process control system, where a graphical user interface of said process control system is arranged with graphic representations of one or more control objects for monitoring and/or control of a process or an equipment and displayed by a control system client application on a computer or workstation, the method comprising the steps of: running an application for monitoring and/or controlling at least one said control object in a computing process environment separate from said process control system, generating by means of the application a second graphic user interface display comprising the at least one said control object, sending the second graphical user interface display in a graphic output format from the application to said process control system via an intermediate service integrating the second graphical user interface of the application in said graphical user interface.

In another aspect of the invention, a system is disclosed for control of a process in a process control system, wherein a graphical user interface of said process control system is arranged with graphic representations of one or more control objects for monitoring and/or controlling a process or an equipment and displayed by a control system client application on a computer or workstation, said system further comprising a Server Node arranged for running an application, e.g., server application, for monitoring and/or controlling at least one of said control objects in a computing process environment separate from said process control system, and an intermediate service or remote viewer service arranged for sending a second graphic user interface display comprising the at least one of said control objects generated by means of the server application in a graphic output format, from the server application to said process control system for integration of the second graphical user interface of the server application into said graphical user interface.

In another aspect of the invention, a human-machine interface for monitoring is disclosed.

A computer program, and for example a computer program recorded on a computer-readable medium, is disclosed in another aspect of the invention.

The principle advantage of the present invention is that it provides a solution where user interfaces of integrated applications can be integrated in a single system user interface without installing any code components from those applications. This is referred to as View Integration. The invention involves remote viewing, or sharing a view, and does not involve sharing an executable computer application or program.

View Integration, as used in this description, is when the user interface (UI) of a non-core application, or extended application, is streamed to an integrated view in the control system's user interface (UI), using a technique similar in principle to the Windows service called Remote Desktop.

The integrated application runs in a separate computing process environment (sometimes referred to as a sandbox) and presents its user interface (UI) in the usual way. However, rather than rendering this graphical information on a user interface in this separate environment, the graphical information is intercepted and sent over as pixel information (or in any other format for transmitting a graphic image) to the environment where the control system's user interface is running. Here the graphical information from the integrated application is combined with other graphical information representing the control system's user interface, as well as the user interfaces of other integrated applications, into an integrated graphical user interface of the control system. When the graphical information of the user interface of the integrated application is in focus, mouse clicks and keyboard events are sent to the integrated application running in the separate computing process environment.

BRIEF DESCRIPTION OF THE DRAWINGS

A more complete understanding of the method and system of the present invention may be obtained by reference to the following detailed description when taken in conjunction with the accompanying drawings wherein:

FIGS. 5a, 5b each show a schematic flowchart of the invention according to FIG. 1 and in particular for methods according to an embodiment of another aspect of the invention.

DETAILED DESCRIPTION OF THE INVENTION

Figure 1:
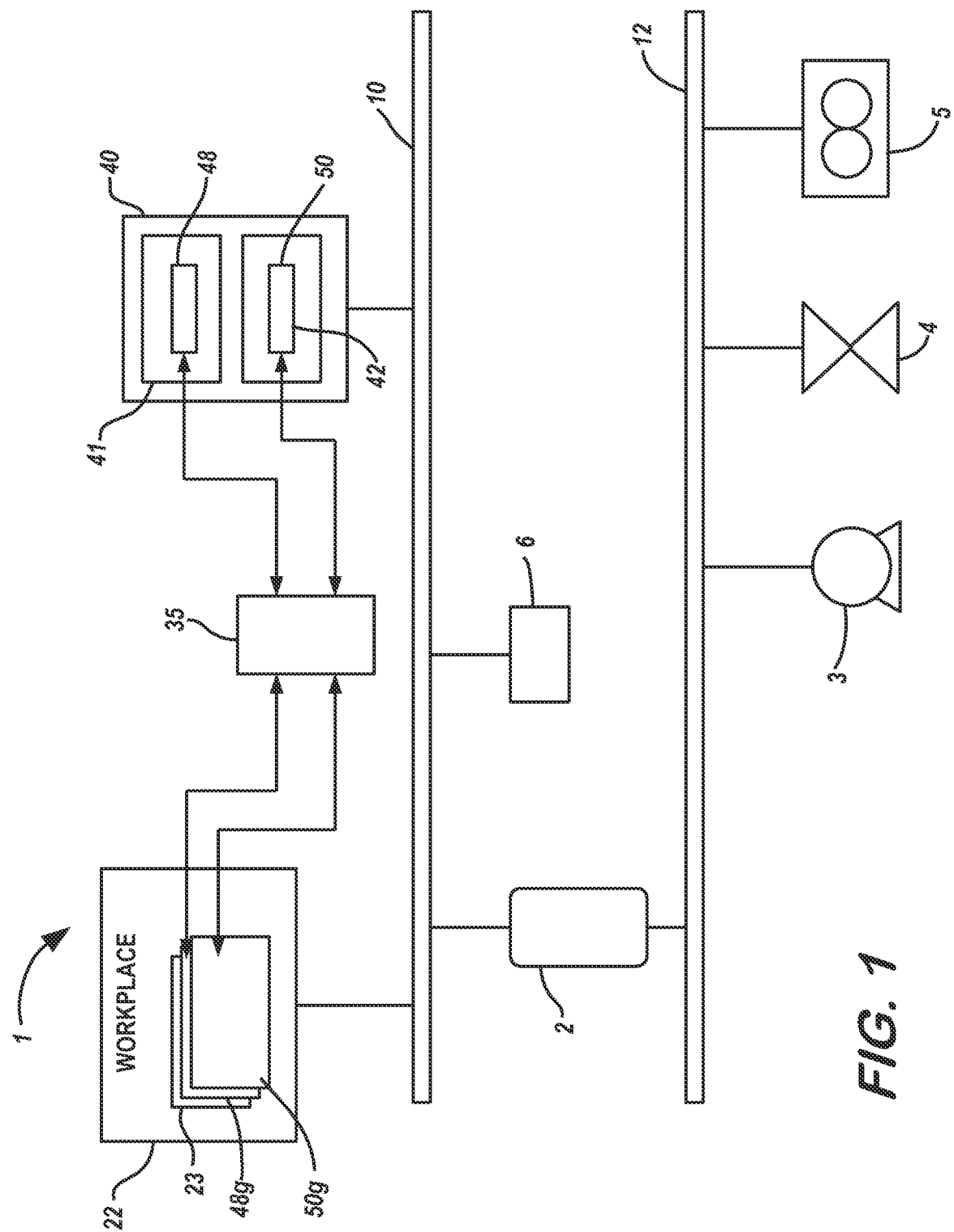
FIG. 1 shows a schematic block diagram of a process control system according to an embodiment of a first aspect of the invention.

FIG. 1 shows a simplified diagram for a process control system. The system comprises controller 2, and server 6 running control functions and business logic, for controlling the equipment and controls included in an industrial process. Many of these control functions are core processes that operate in real-time, and a number of them may be safety critical. The figure shows a process control system 1 with equipment, such as a motor 3, valve 4, field device such as a flow meter 5, connected thereto. The process control system 1 includes a data network 10 and a field bus 12. Parts of the data communications may be carried out by both wired and wireless links.

Connected to the process control system is a workstation (Workplace) arranged as a Client Node and running a Control System Client application 22, which provides a first graphic user interface (GUI) 23. This first graphic user interface (GUI) is an interface to a client application running business logic or core processes concerned with control of the industrial process.

A server node 40 is connected to the process control system by the data network 10. In the server node, in a separate computing environment, or a separate computing process environment, one or more extended applications are run. The extended applications each also provide a GUI or a UI, referred to in this description as a second graphic user interface 48 and 50. The graphic image data output of these interfaces is intercepted and sent via a remote presentation protocol 35, or a remote viewer system, to the Control System Client application 22. The one or more second graphic user interfaces 48, 50, are integrated into the first graphical user interface 23 of the Control System Client application 22, shown as 48g and 50g. Thus certain control objects are represented in the GUI of the Control System Client application 22 by GUI graphics, but no code for the GUIs 48, 50 execute in the process environment of the Control System Client application 22. That code, applications producing the GUIs 48, 50, runs in the server node 40.

Figure 2:
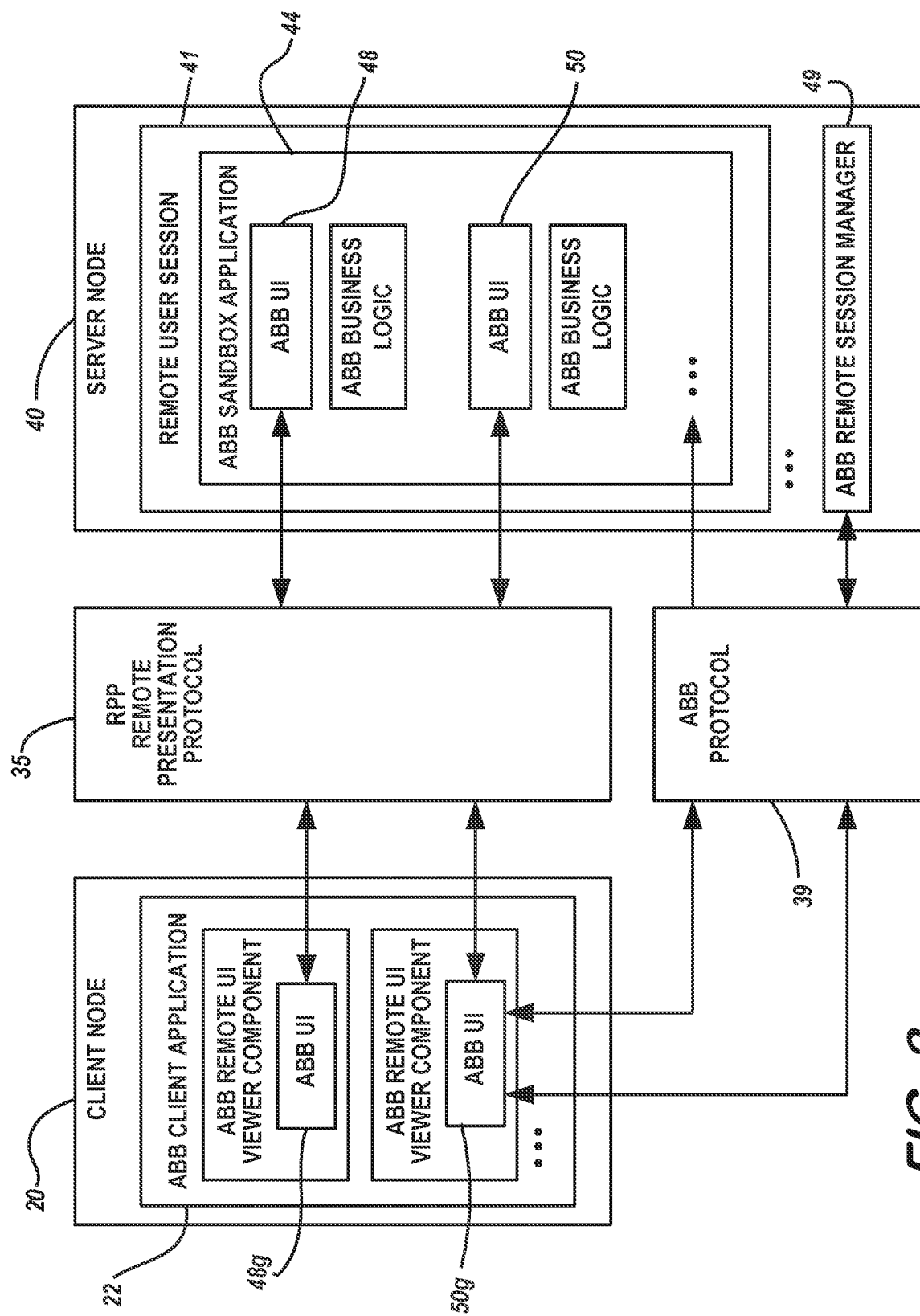
FIG. 2 shows a schematic block diagram of the invention according to FIG. 1 and in particular of a Client Node of a control system and a Server Node arranged connected to the control system according to an embodiment of an aspect of the invention.

FIG. 2 shows another embodiment. The figure shows a Server Node 40 at which a single remote user session 41 is running. In the remote user session, a sandbox application, for example an ABB Sandbox application 44, is running. Running inside the sandbox is an extended application, which in this case is called an ABB UI Component, indicated with ref nr. 48. Also running in the sandbox is an ABB Business logic application. This business logic application has a UI, ABB UI. The GUI of that sandbox application 48 is intercepted and sent via a remote presentation protocol (RPP) 35 to a Control System Client application, shown here as ABB Client Application 22. The graphic image of the GUI from the application 48 in the sandbox is then integrated 48g by the control system client application, ABB Client Application 22, into the GUI of the control system client application. Server Node 40 may comprise a remote session manager function, in this embodiment an ABB Remote Session Manager 49. A separate protocol 39 may be used by the ABB Remote Session Manager 49 to interact with ABB Client Application 22.

Figure 3:
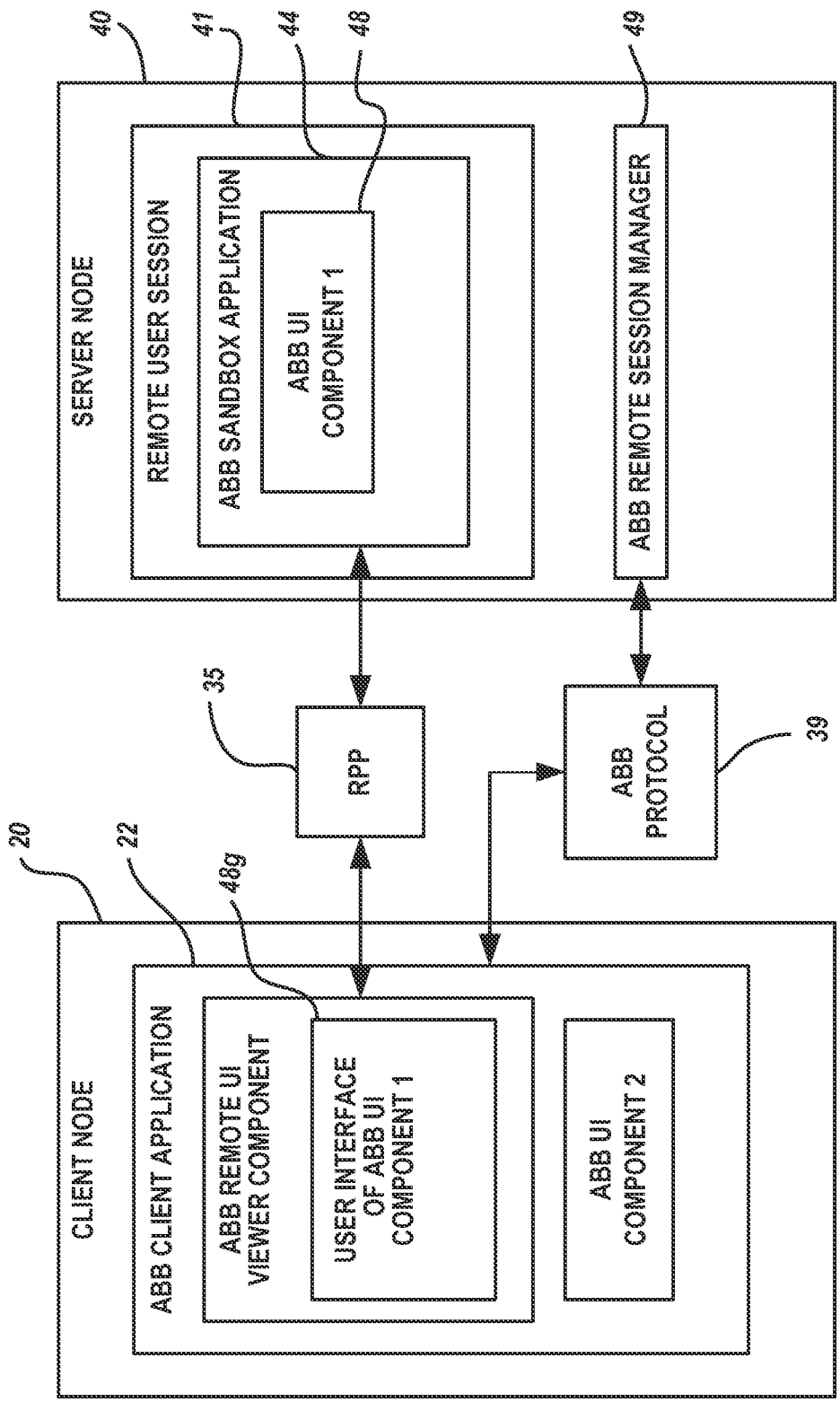
FIG. 3 shows another embodiment of the invention of FIG. 1 and in particular a modular arrangement not including a Business Logic component in the sandbox application.

FIG. 3 shows a preferred embodiment. The figure shows a Server Node 40 at which a single remote user session 41 is running. In the remote user session, a sandbox application, for example an ABB Sandbox application 44 is running. Running inside the sandbox is an extended application, which in this case is called an ABB UI Component, indicated with ref nr. 48. The GUI of that application 48 is intercepted and sent via a remote presentation protocol (RPP) 35 to a Control System Client application, shown here as ABB Client Application 22. The graphic image of the GUI from the application 48 in the sandbox is then integrated 48g by the control system client application, ABB Client Application 22, into the GUI of the control system client application. Server ode 40 may comprise a remote session manager function, in this embodiment an ABB Remote Session Manager 49. A separate protocol 39 may be used by the ABB Remote Session Managers 49 to interact with ABB Client Application 22.

Figure 6:
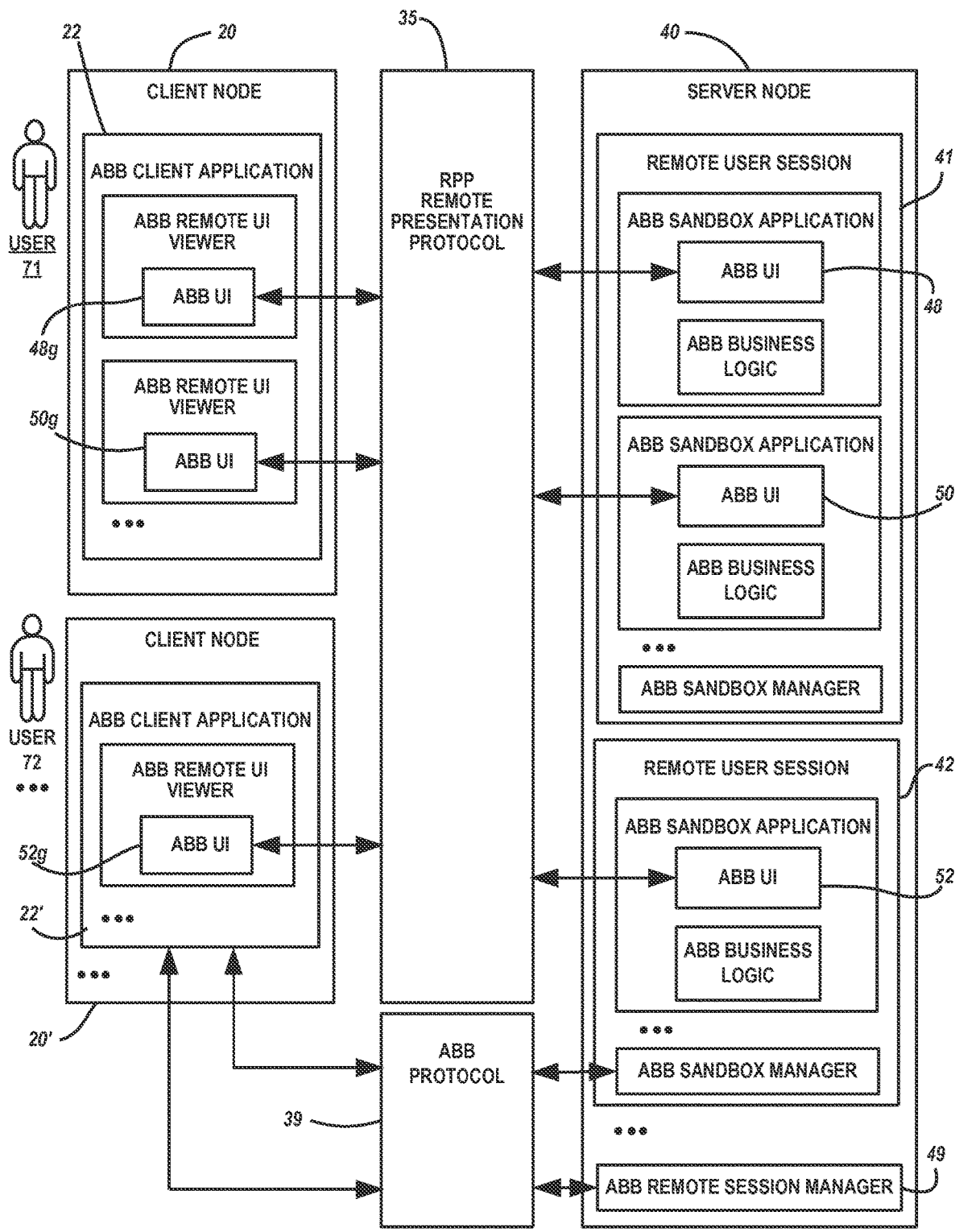
FIG. 6 shows the invention of FIG. 1 and in particular a multi user arrangement according to an embodiment of the aspect of the invention.

FIG. 6 shows another embodiment in which multiple remote users, Users 71, 72, are involved. In FIG. 6, Server Node 40 comprises a plurality of Remote User Sessions, Session 41, Session 42, and so on. In Remote User Session 41, two sandbox applications, ABB Sandbox Applications, are running. In this embodiment, a business logic application or function may run in the sandbox. The GUI of a first business logic function, ABB UI 48 is intercepted and sent via remote presentation protocol (RPP) 35 and integrated in the client application, ABB Client Application 22, by means of an ABB Remote UI Viewer function, shown as 48g. The figure shows that User 71 at the first Client Node 20 has two GUIs (48g, 50g) integrated in the ABB Client Application 22 using the remote viewers. User 72 at a second Client Node 20' also has GUI (52g) from an extended application, executing in a sandbox running in Remote User Session 42 on the same Server Node 40, the graphic image output of which is intercepted and routed by RPP 35 to ABB Client Application 22' where it is likewise integrated into the ABB Client Application 22' using a remote viewer.

Figure 4:
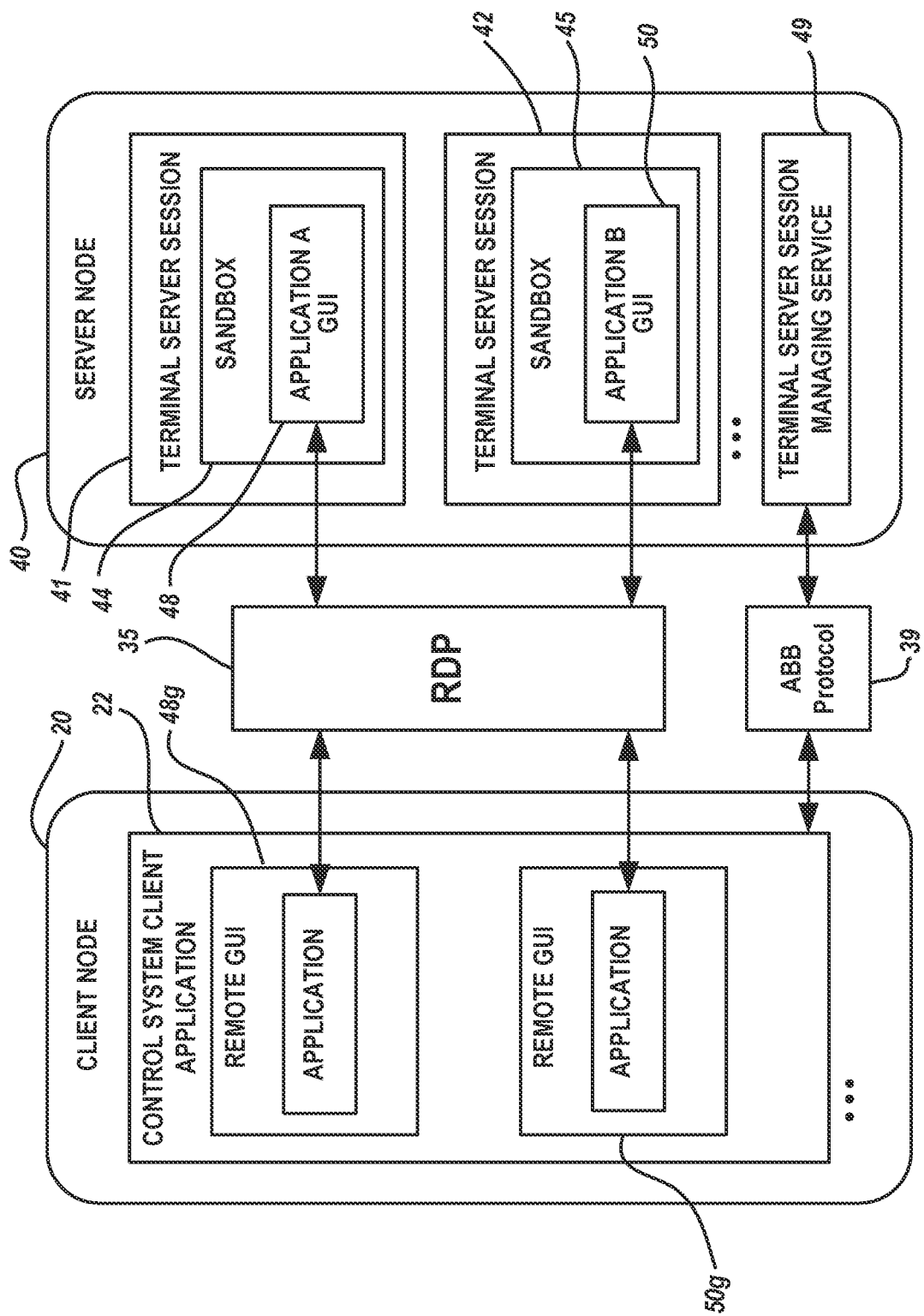
FIG. 4 shows the invention of FIG. 1 and in particular an embodiment arranged using known components of a widely used operating system.

FIG. 4 shows an embodiment in which many of the applications and services are parts of a Windows operating system environment. The figure shows a client node 20 and a server node 40. At the client node, a control system Client Application 22 is running and displaying a graphical user interface (not shown). The client node runs on a workstation or other suitable terminal device. Server node 40 runs one or more Terminal Server sessions, 41, 42. Each Terminal Server Session includes a separate computing process environment, otherwise known as a sandbox 44, 45. An extended application, Application A, running in the sandbox produces a graphical user interface (GUI) 48, and likewise a second extended application, Application B, may also produce, in a separate Terminal Session 42, a GUI 50.

In this embodiment, the integrated application or the Sandbox Application runs in a Terminal Server session on a server node and its graphical user interface is transmitted or remoted via Remote Desktop Protocol (RDP) 35 to the Control System Client Application 22 on a client node 20 of the process control system 1. The Control System Client Application 22 is capable of concurrently viewing several remote user interfaces from several concurrent User Sessions (Terminal Server Sessions). The Control System Client Application 22 can create remote sessions dynamically by using the Terminal Server Session Manager Service 49 on the server node 40. In this way, a solution is provided where user interfaces of integrated applications can be integrated in a single system user interface of the process control system without installing any code components from those applications.

The GUI 48 of Application A, an extended application, is sent via an intermediate service to the control system Client Application 22 running on the client node 20. The intermediate service may run using a Remote Desktop Protocol (RDP) 35 and implemented as a Remote Desktop session, a service provided by a Windows™ operating system environment, such as Windows Server 2003. The client node 20 may run a RDP viewer client which may be a client adapted for, or ported to, another operating system different from Windows, such as Unix.

The Server Node 40 may comprise a terminal Server Session Manager service 49 which manages the one or more Terminal Server Sessions 41, 42. The Manager service 49 may interact with Control System Client Application 22 running on the Client Node 20 using a channel 39 separate from, and different to the protocol from the intermediate service, in this case the communication using RDP 35.

The Control System Client Application 22 provides a graphical user interface to one or more core processes controlling the industrial process. These core processes may be run-time implementations. The graphic user interfaces 48, 50 running in the separate computing environments, sandboxes 44, 45, are sent as graphic information only to Control System Client Application 22. Client Application 22 integrates those GUIs 48, 50 into the graphical user interface of Client Application 22.

The integrated applications run in separate environments so called sandbox) and present their user interfaces in the usual way. However, rather than rendering this graphical information on a user interface in these environments, the graphical information is intercepted and sent over as pixel information (or in any other suitable format to construct a graphic) to the environment where the control system's native user interface is running. Here the graphical information is combined with other graphical information representing the control system's user interface as well as the user interfaces of other integrated applications into a single, integrated user interface.

When the graphical information of the user interface of the integrated application is in focus as GUI 48g or 50g, mouse clicks and keyboard events are sent to the integrated application 48, 50. Thus no code components from the integrated applications execute in the same computing process environment as the core functions of the control system. The integrated applications run (execute) in the isolated environment of a sandbox. Only the graphic output from the integrated application, as a bitmap, or as instructions to a graphic processor card or chip, are combined into the graphical user interface of the control system.

Communication may be carried out by wire or wirelessly. The Client Node 20 may be connected to a node or gateway of a wired or wireless LAN or may be another kind of data communication network and running any radio protocol suitable for an industrial milieu, such as any standard issued by the Bluetooth Special Interest Group (SIG), any variation of IEEE-802.11, WiFi, Ultra Wide Band (UWB), ZigBee or IEEE-802.15.4, IEEE-802.13 or equivalent, or similar.

The user may monitor, supervise and or control process equipment using a workstation connected to the control system. This may also be carried out in remote mode by an engineer or other authorized person logged in to the control system with appropriate privileges. The methods of control as described above and elsewhere in this specification may be carried out by a computer application comprising computer program elements or software code which, when loaded in a processor or computer, causes the computer or processor to carry out the method steps.

The method may be described as comprising steps according to FIGS. 5a, 5b. FIG. 5a shows a simplified flowchart for one or more methods according to another aspect of the invention. The figure shows:

55 Extended application 1 runs and generates a GUI 48 including a control object of the process;

56 a process running in a Remote User Session or Terminal User Session intercepts GUI 48 of application 1 running in the sandbox

57 a process running in Remote User Session or Terminal User Session sends GUI 48 of application 1 to the Control System Client Application 22 (or ABB Client Application 22);

58 Control System Client Application 22 integrates the graphic image information from the GUI of extended application 1 running in the sandbox into the GUI of the Control System Client Application 22.

FIG. 5b shows

65 Control System Client Application 22 displays its GUI, the first GUI, with the graphic information 48g integrated into the first GUI;

67 Control System Client Application 22 receives user input to GUI 48g integrated in the first GUI of the Control System Client Application 22 and sends the information of that input via an intermediate service, RPP or RDP, to the extended application 1 running in the sandbox;

69 Application 1 running in the sandbox processes the user input information, and updates the GUI 48 to show an updated state of the control object in GUI 48.

The graphic image data of GUI 48 is intercepted and sent via RPP/RDP to the client application 22 as per step 55.

In an alternative embodiment, the solution is arranged such that Sandbox Application 44, 45 manages one or more Terminal Services Sessions 41, 42. In this case the Sandbox Application must have the ability to control what GUI (window) to expose in which session.

The methods of the invention may, as previously described, be carried out by means of one or more computer programs comprising computer program code or software portions running on a computer or a processor. The microprocessor (or processors) comprises a central processing unit CPU performing the steps of the method according to one or more facets of the invention. A part of the program may be stored in a processor, but also stored in a ROM, RAM, PROM, EPROM or EEPROM chip, in similar memory means or on a Server Node 40. Data may be accessed by applications such as the Control System Client Application 22 in the control system by means of any of: OPC, OPC servers, an Object Request Broker such as COM, DCOM or CORBA, a web service.

It should be noted that while the above describes exemplifying embodiments of the invention, there are several variations and modifications which may be made to the disclosed solution without departing from the scope of the present invention as defined in the appended claims.

What is claimed is:

1. A method for control in an industrial process control system, the industrial process control system including control objects configured to monitor and control an industrial process or equipment in the industrial process control system, said method comprising the steps of:
    running a client application locally in a first computer processing environment on a computer or workstation, which is communicatively connected to the process control system, said client application executing processes to control and monitor said industrial process or equipment, said client application providing a first graphical user interface which includes graphic representations of one or more of said control objects for monitoring and controlling said industrial process or equipment;
    running a second application locally in a second computer processing environment for monitoring and controlling at least one of said control objects, said second computer processing environment is communicatively connected to the process control system and is separate from said first computer processing environment, said second application providing a second different graphical user interface which includes graphic representations of said at least one of said control objects, said second graphical user interface being different from the first graphical user interface;
    generating a graphic image output of said second graphical user interface, said graphic image output is configured for transmission to the first computer processing environment;
    sending said graphic image output in a graphic output format from said second application to said first computer processing environment via an intermediate service;
    integrating said second graphical user interface, by means of view integration, into said first graphical user interface so that a single integrated graphical user interface concurrently displays data processed by the client application and data processed by the second application;
    accepting user input to said second graphical user interface within said integrated graphical user interface; and
    sending information from said user input via said intermediate service to said second application, said second application processing said information in said second computer processing environment and updating said second graphical user interface in response to processing said information to show an updated state of said at least one of said control objects.

2. The method according to claim 1, further comprising processing said information from said user input in said second computer processing environment and returning, via said intermediate service, an updated graphic image output of said second graphical user interface in a graphic output format for integration with said first graphical user interface.

3. The method according to claim 1, further comprising displaying on said first graphical user interface an update, said update being at least one of a value, a status, or an event.

4. The method according to claim 1, further comprising providing said graphic image output of said second graphical user interface in a graphic output format by means of a remote viewer service and providing said second application running in said second computer processing environment by means of a viewer service running on a server.

5. The method according to claim 1, wherein said graphic image output is in the form of a pixel-based graphic or bitmap.

6. The method according to claim 1, wherein said graphic image output is in the form of a vector-based graphic.

7. The method according to claim 1, wherein said graphic image output is in the form of graphic display instructions for a graphic display apparatus.

8. The method according to claim 1, further comprising displaying on said first graphical user interface a status or condition of said process or equipment on a display means of at least one of a workstation, a portable computer, a dedicated handheld tool for configuration/maintenance, a personal digital assistant, a mobile phone, or a mobile computing device.

9. A computer program product encoded on a non-transitory computer readable medium executing on a processor for control in a process control system, said computer program product comprising code to configure said processor to perform the steps of the method according to claim 1.

10. An industrial process control system comprising:
    control objects configured to monitor and control an industrial process or equipment;
    a workstation running a client application locally in a first computer processing environment, said workstation is communicatively connected to one or more of said control objects, said client application executing processes to control and monitor said industrial process or equipment, said client application providing a first graphical user interface which comprises graphic representations of the one or more of said control objects for monitoring and controlling said industrial process or equipment;
    a server node running a second application locally in a second computer processing environment, said server node is communicatively connected to at least one of said control objects and is separate from the workstation, said second application providing a second different graphical user interface which includes graphic representations of the at least one of said control objects, said second graphical user interface being different from the first graphical user interface;
    the server node generating, by means of the second application, a graphic image output of said second graphical user interface, said graphic image output is configured for transmission to the first computer processing environment; and an intermediate service sending the graphic image output in a graphic output format from said second application to said first computer processing environment;

wherein said client application integrates said second graphical user interface, by means of view integration, into said first graphical user interface so that a single integrated graphical user interface concurrently displays data processed by the client application and data processed by the second application;

wherein said second graphical user interface within said integrated graphical user interface accepts a user input, said intermediate service sends information from said user input to said second application, and said second application processes said information in said second computer processing environment and updates said second graphical user interface in response to processing said information to show an updated state of said at least one of said control objects.

11. The system according to claim 10, wherein said intermediate service is configured to send said graphic image output from said second graphical user interface to said client application using Remote Desktop Protocol.

12. The system according to claim 10, wherein said intermediate service uses Remote Desktop Protocol to send information of said user input to said second application.

13. The system according to claim 10, wherein said intermediate service is configured to send graphic image output from said second graphical user interface to said client application using a communication channel.

14. The system according to claim 10, wherein said Server Node has a Terminal Server Session Manager service application.

15. The system according to claim 10, wherein at least one separate computer processing environment is configured to manage multiple Terminal Server Sessions.

16. The system according to claim 10, wherein said process control system has data network or gateway connections to at least one of a workstation, a portable computer, a handheld tool for configuration/maintenance, a personal digital assistant, a mobile phone, or a mobile computing device.

17. A method of using a server and a client for control in an industrial process control system, the process control system including control objects configured to monitor and control an industrial process or equipment in the industrial process control system, said method comprising the steps of:

running a client application locally in a first computer processing environment of said client, said client is communicatively connected to the industrial process control system, said client application executing processes to control and monitor said industrial process or equipment, said client application providing a first graphical user interface which includes graphic representations of one or more of said control objects for monitoring and controlling said industrial process or equipment;

running a second application locally in a second computer processing environment of said server, which is communicatively connected to the process control system and is separate from said first computer processing environment, said second application providing a second different graphical user interface which includes graphic representations of at least one of said control objects, said second graphical user interface being different from the first graphical user interface;

generating, by means of said second application, a graphic image output of said second graphical user interface, said graphic image output is configured for transmission to the first computer processing environment;

sending said graphic image output in a graphic output format from said second application to said first computer processing environment via an intermediate service;

integrating said second graphical user interface, by means of view integration, into said first graphical user interface so that a single integrated graphical user interface concurrently displays data processed by the client application and data processed by the second application;

receiving user input through said integrated graphical user interface, said user input including information about the one or more of said control objects or about the at least one of said control objects, wherein when said user input includes information about said at least one of said control objects, said second application processes said information in said second computer processing environment and updates said second graphical user interface in response to processing said information to show an updated state of said at least one of said control objects.

18. A method for control in an industrial process control system, the industrial process control system including control objects configured to monitor and control an industrial process or equipment in the industrial process control system, said method comprising the steps of:

running a client application locally in a first computer processing environment on a computer or workstation, which is communicatively connected to the process control system, said client application executing processes to control and monitor said industrial process or equipment, said client application providing a first graphical user interface which includes graphic representations of one or more of said control objects for monitoring and controlling said industrial process or equipment;

running a second application locally in a second computer processing environment, which is communicatively connected to the process control system and is separate from said first computer processing environment, said second application providing a second different graphical user interface which includes graphic representations of at least one of said control objects, said second graphical user interface being different from the first graphical user interface;

generating a graphic image output of said second graphical user interface, said graphic image output is configured for transmission to the first computer processing environment;

sending said graphic image output in a graphic output format from said second application to said first computer processing environment via an intermediate service;

integrating said second graphical user interface, by means of view integration, into said first graphical user interface so that a single integrated graphical user interface concurrently displays data processed by the client application and data processed by the second application;

accepting user input to said second graphical user interface within said integrated graphical user interface; and sending information from said user input via said intermediate service to said second application, said second application processing said information in said second computer processing environment and updating said second graphical user interface in response to processing said information to show an updated state of said at least one of said control objects.

\* \* \* \* \*